Figure 1:
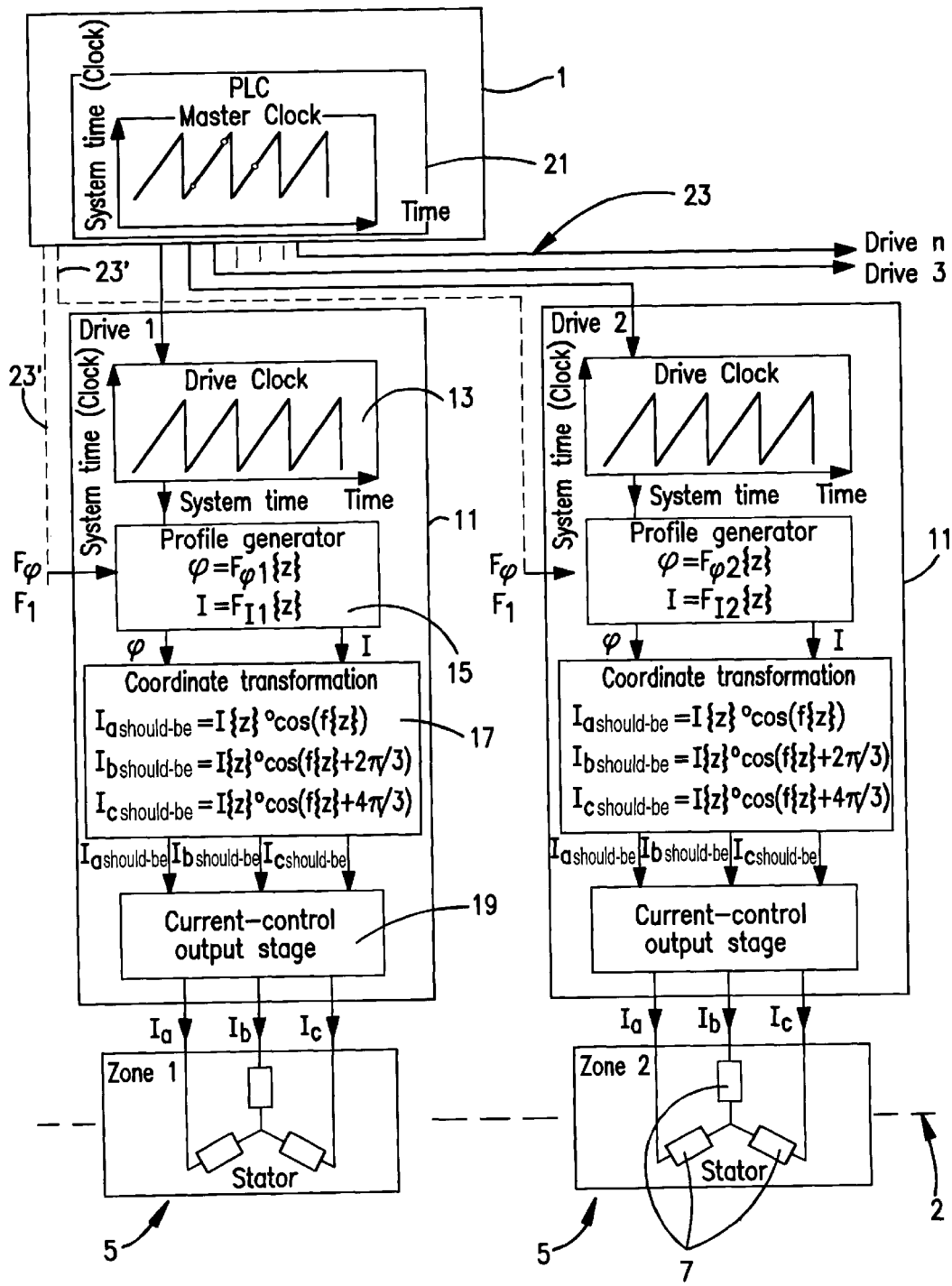

United States Patent

Oedl et al.

[11] Patent Number: 6,011,367
[45] Date of Patent: Jan. 4, 2000

[54] CONTROLLER FOR DEVICES DRIVEN BY LINEAR MOTORS

[75] Inventors: Günter Oedl, Salzburg, Austria; Rudolph Kreiner, Inzell; Wolfgang Zintz, Vachendorf, both of Germany

[73] Assignee: Bruckner Maschinenbau GmbH, Germany

[21] Appl. No.: 09/043,782

[22] PCT Filed: Aug. 14, 1997

[86] PCT No.: PCT/EP97/04451

§ 371 Date: Mar. 30, 1998

§ 102(e) Date: Mar. 30, 1998

[87] PCT Pub. No.: WO98/08702

PCT Pub. Date: Mar. 5, 1998

[30] Foreign Application Priority Data

Aug. 26, 1996 [DE] Germany ............ 196 34 449

[51] Int. Cl.[7] .................................................. H02P 7/74
[52] U.S. Cl. ...................... 318/38; 318/135; 318/41
[58] Field of Search ....................... 318/38, 41, 50, 318/85, 135

[56] References Cited

U.S. PATENT DOCUMENTS

| | | | |
|---|---|---|---|
| 4,675,582 | 6/1987 | Hommes et al. | 318/38 |
| 4,825,111 | 4/1989 | Hommes et al | 310/312 |
| 4,853,602 | 8/1989 | Hommes et al | 318/38 |
| 4,876,966 | 10/1989 | Okawa et al | 104/290 |
| 5,036,262 | 7/1991 | Schonbach | 318/38 |
| 5,113,125 | 5/1992 | Stacey | 318/721 |
| 5,274,317 | 12/1993 | Utley et al | 318/802 |
| 5,530,323 | 6/1996 | Breitzmann | 318/85 |

FOREIGN PATENT DOCUMENTS

| | | |
|---|---|---|
| 0417805A1 | 3/1991 | European Pat. Off. . |
| 41 06 850 A1 | 9/1992 | Germany . |
| WO 88/10188 | 12/1988 | WIPO . |

*Primary Examiner*—Nestor Ramirez
*Assistant Examiner*—Judson H. Jones
*Attorney, Agent, or Firm*—Nixon & Vanderhye

[57] ABSTRACT

An improved control device for linear-motor-driven equipment, in particular for the drive of tenters of a film stretching plant, has a central control device (1) and a multiplicity of converters (11) that are activated thereby, at least indirectly. An improvement is achieved by a phase profile, which describes a relationship between the phase angle, the current amplitude and a clock pulse, for activating the stator winding (7) in a relevant zone (5), being able to be predefined for the converters (11), and by the corresponding phase-profile data for the activation of the stator winding (7) being able to be calculated and/or generated in the converters (11). In addition, a synchronization device, via which the time signals in the converters can be synchronized with one another during operation, is provided.

16 Claims, 2 Drawing Sheets

CONTROLLER FOR DEVICES DRIVEN BY LINEAR MOTORS

Control device for linear-motor-driven equipment The invention relates to a control device for linear-motor-driven equipment, in particular for the drive of tenters of a film stretching plant, according to the precharacterizing clause of claim 1.

Linear-motor drives are known, for example, from U.S. Pat. No. 5,036,262, U.S. Pat. No. 4,853,602, U.S. Pat. No. 4,825,111 or U.S. Pat. No. 4,675,582. Drive systems of this type based on a linear-motor drive can in principle be used not only in the production of plastic film within the context of a stretching plant but also in other areas, as is described, for example, in U.S. Pat. No. 4,853,602.

Concatenated linear synchronous motor systems comprise, as so-called primary parts, a multiplicity of zones that are connected one behind another and have stator windings which can be activated at different phase angles with preselectable current amplitudes. The activation is carried out via converters or frequency converters, which comprise an appropriate output, power or driver stage or have a stage of this type connected downstream.

Along these primary parts, that is to say along the linear-motor system that comprises the stator windings and is organized into a plurality of zones that are connected one behind another, so-called secondary parts can then be moved over the magnetic field generated. In the case of film stretching plants, these secondary parts are so-called tenters.

The converters disclosed by U.S. Pat. No. 4,853,602 each have a dedicated control part, which comprises a computing unit having address counters, memories, selection logic etc., which are connected to a central control unit via a bus. Stored in the memories are profiles which represent three-bit pulse patterns as a function of time. They are addressed by address counters which, for their part, are activated by clock signals from the timebase of the central control unit. The profiles are selected such that the transition from one sector into the next can take place in an overlapping manner at identical frequency and phase angle.

A linear drive for in-house transport systems has also been disclosed by U.S. Pat. No. 4,876,966. In this case, the stator is subdivided into a multiplicity of sectors, each of which is fed from a converter. Speed profiles are generated and processed in the computing units through transferred boundary conditions (maximum speed, acceleration, etc.). The matched transition from one sector into the next is functionally necessary.

Further ore, it can be taken from the prior publications U.S. Pat. No. 5,274,317, EP 417 805 A1 and U.S. Pat. No. 5,113,125 that the calculation of the invertor switching patterns via the time variation of current amplitudes and phase angle is usual. In the case of digital processing, the dependence of these variables on the clock results from the time variation.

The active synchronization of the invertor timebases is likewise fundamentally known from U.S. Pat. No. 5,530,323. The converters assigned to the stators each have a timebase with a timer. These timebases are synchronized by pulses from and to the central unit.

In the case of the abovementioned linear synchronous motor systems, insofar as all the converters are activated in real time by a central computer or control unit, it is necessary to take account of the fact that, for example, at an initial frequency of 60 Hz (corresponding to a speed of 6.6 m/s and a pole pitch of 0.055 m) and at a resolution of 360° in 6 steps, in the case of 150 converters 3 bits have to be transmitted every 2 ms over the communication bus structure which therefore leads, at 16.6 ms/8, to a net data rate of 150*3*500= 225 kBaud, and this has to be done with a high requirement on the time accuracy.

More recent generations of frequency conversion allow a sine-wave modulation rather than simulating the output current in 6 steps (that is to say in the manner of a six-step drive). This requires a finer predefinition of the set point. The requirement on the transmission medium (data bus structure) increases quadratically as the resolution is made finer since, on the one hand, the bit width per set point increases and, on the other hand, as a result the set points also have to be transmitted more often.

On this basis, the object of the present invention is to provide a control device for linear-motor-driven equipment that is improved with respect to the prior art and in which the outlay for the data transmission and the communication structure between a central process-control computer and the individual frequency converters that activate the linear motors, that is to say the individual zones of the linear motors, is considerably minimized.

According to the invention, the object is achieved in accordance with the features specified in claim 1. Advantageous configurations of the invention are specified in the subclaims.

Since, according to the present invention, the outlay for the data transmission and the communication structure between a central process-control computer and the individual frequency converters is considerably minimized, it is possible for the invention to be used primarily even in plants that are operated at a high drive speed.

According to the invention, it is not necessary for all the data for the respective phase profile for activating the linear-motor zones to be transmitted from the central computer to the converters. It is sufficient that these data are made available at least only once to the individual converters. For the appropriate activation of the linear-motor drive, it is then essentially only necessary for the clock generators in the individual converters to be synchronized via the data bus communication structure. This synchronization is preferably carried out as a function of a clock generator in the central control unit via which all the clock generators in the converters, these generators also being referred to in some cases below as slave clock generators, are activated. The master clock in the central control unit is used to control the sequencing speed of the overall system, that is to say the drive speed of the secondary parts and hence, in the case, for example, of a film stretching plant, the drive speed of the tenters and hence, for example, the film entry speed.

Each converter, or groups of several converters, has or have a dedicated computer, preferably in the form of a profile generator and/or a device for generating a coordinate transformation for calculating the current intensities in the stator windings of the primary part. Since the appropriate data are thus processed and generated locally in the individual converters, in this context the data transmission between a central control unit and the individual converters is reduced. If required, it is also possible for an appropriate computer unit, preferably in the form of a profile generator and/or a device for coordinate transformation, to be provided in each case for several converters, that is to say for groups of at least two converters.

Even in the event of a change in the speed and hence in the clock that is predefined by the master clock, the synchronism of the clock frequencies generated in the converters must be ensured, and this can preferably be carried out via the data bus communication structure between the central control unit and the individual converters connected downstream, even if fundamental solutions are conceivable in which the synchronization of the individual clock generators that are provided in the converters can be carried out, for example, in an interactive control chain or by means of an information flow structure in which the data are, for example, forwarded from one converter to the next in only one direction in the manner of a successive switching system (daisy-chain), rather than by a central control unit.

The considerations cited above are based on the fact that the speed profile for all the secondary parts is constant over a respective zone (which is activated by one converter) in the case of a predefined speed profile, and the secondary parts enter the system at a constant time interval T, these requirements being repeated at the clock cycle T for each converter. On this basis, if each converter is provided with the appropriate data for its specific phase profile (which is given by the relationship between the phase angle, the current amplitude and the clock), after this phase profile has been transmitted once it is no longer necessary to retransmit the appropriate data for each converter. Only the data transmission for the synchronization of the clock generators in the converters is necessary.

In a preferred embodiment of the invention, according to claim 2, provision is made for the overall plant to be synchronized with the clock of the master clock. This makes possible the advantage according to a preferred embodiment of the invention, according to which, for a change in the plant speed, for example for an increase in the plant speed, it is only necessary for the clock that is predefined by the master clock to be accelerated appropriately, as a result of which all the converters execute their specific program in a shorter time. This method ensures that, on the one hand, the speed profile (in relation to an initial speed or entry speed $v_0$) always remains constant, irrespective of the absolute value of the production speed, that is to say of the plant speed. In addition, it is possible by this means to realize the further advantage that no supplementary synchronization of the individual quartz clocks or clock generators in the respective converters is necessary since, as explained, the synchronization is carried out in the form of a corresponding activation as a function of the clock that is predefined by the master clock.

In a preferred embodiment of the invention, it is sufficient if, for each clock cycle T, the time is sent as an absolute value at least once, preferably simultaneously, to all the converters, in order in this way to synchronize all the converters.

Even in the event of a failure of a transmitted time telegram from the central control unit to the converters, this does not lead in principle to any impairment of the control system, since the converters preferably comprise a device in order to obtain the time values needed for said converters by means of extrapolation in the event of a failure of corresponding clock data.

Finally, in a development of the invention, further measures are provided which make it possible for a change in the desired speed as a result of a change to the master clock rate to be carried out as a specific attenuated adaptation to the new set point predefinition to the master clock rate when this corresponding data information arrives at the respective converter, rather than leading to an abrupt correction to the clock information.

The provision of the information of the phase profile in order to generate the activation values of the individual stator windings in the zones of the primary linear-motor drive can be carried out in different ways. It is preferable for the necessary data to be made available to the converter in the manner of a look-up table. The data may be present as stepped values. If required, interpolation values can be calculated by the converter.

It is possible for the phase profile to be transmitted such that the appropriate values for the phase angle and the current amplitude for the individual zone-related stator windings are transmitted as a function of predefined clock values.

However, in a modification to the invention, the phase profile may also be made available in the form of a starting angle and a table for the angular velocity $d\phi/dz$, as a function of the smallest resolvable time unit of the clock generator on the converter side.

Finally, in a further modification, the phase profile may also be transmitted in the form of a start time and a table for the angular velocity, as a function of the smallest resolvable angle unit of the clock generator on the converter side.

Since a change in the speed profile in each case results in a change from the previous phase profile to a new phase profile for each individual converter, and this occurs with the system running, it is preferable for further measures that support this change operation to be provided. In the event of a change in the speed profile, this change is preferably not carried out abruptly, in particular since the secondary parts that are moved by the linear-motor drive that is subdivided into zones have to be brought to the new speed profile by means of an equalization operation (transition). During this transition period, it is therefore necessary for each secondary part, in relation to a relevant zone of the primary part, to pass through a specific phase profile which differs both from the old profile (previous speed profile) and from the new profile that has not yet been reached (corresponding to the new desired predefinition for the speed profile).

In order not to have to transmit all the phase profiles of the secondary parts involved in the transition to each converter in advance (which in addition would in turn lead to a considerable loading of the data bus communication structure), it is preferable if a transition function from one phase profile to the next is defined for the individual zones, preferably linearly over time. If the transition phase from the abovementioned old profile to the new profile is started simultaneously in all the converters, then the old phase profile, the new phase profile and the transition time until the new phase profile for the secondary parts is reached are sufficient in order to preserve the synchronism. The transition function on the basis of the initial data, and the new data to be reached in accordance with the new profile, can then be calculated in each converter or in each case for groups of individual converters, in order to minimize the data flow in the data bus communication structure between the central control unit and converters.

The invention is primarily suitable for linear synchronous drives. However, the principle may fundamentally also be used for other linear drives, for example an asynchronous drive.

Figure 2:
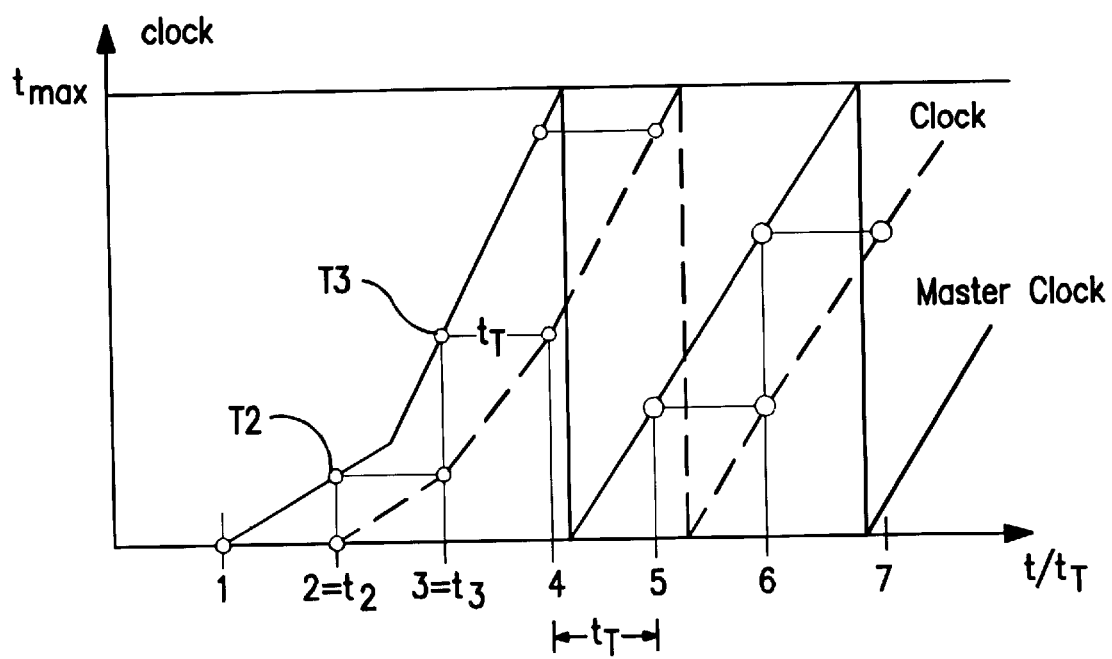

The invention will be explained in more detail below using further details and making reference to exemplary embodiments. Specifically:

FIG. 1: shows a schematic block diagram, in extract form, to illustrate the control device for a linear synchronous motor system; and FIG. 2: shows a diagram to illustrate the clock adaptation in the individual converters in the event of a change in the desired speed in the central control device, that is to say in the master clock generator.

Shown in the block diagram according to FIG. 1 is a central control device 1, which, as a rule, consists of a central computer.

The linear synchronous motor system comprises, on a linear motor system, a so-called primary part 2, which is organized into a multiplicity of zones 5 that are connected one behind another (concatenated). These zones 5 comprise, in a manner known per se, stator windings 7 for generating a travelling magnetic field in order to drive so-called secondary parts, that is to say, for example, in the case of a plastic film stretching plant, in order to drive tenters which are to be driven along the linear motor system 2 and which, as a rule, are provided with a corresponding permanent magnet.

In order to activate the individual linear synchronous motor travel sections, which are organized in zones, so-called converters 11, which are also referred to below as frequency converters, are in each case assigned to the individual zones 5.

Each of the converters 11 assigned to a zone 5 comprises a clock generator 13, which is also referred to below in some cases as a slave clock generator.

Furthermore, each converter 11 has a profile generator 15 which, as a function of the time value generated in the clock generator 13 and using predefined data for the phase angle and the current amplitude, is able to calculate the phase angle φ and the current amplitude I, in each case as a function of time, in accordance with the formulae [sic]

$$\phi = F_{\phi 1}\{z\}$$

and the current in accordance with the following formula $$I = F_{I1}\{z\}$$

Using the clock-dependent phase angle and the time-dependent current amplitude, it is then possible, via this profile generator 15, for the desired current amplitudes for the three current values $I_a$, $I_b$ and $I_c$ that are needed in the exemplary embodiment shown for the three stator windings 7 to be calculated and generated in a transformation stage 17 that is connected downstream, these amplitudes then being supplied to a current-control and output stage 19, a so-called driver stage, at whose outputs the stator winding 7 is connected to the appropriate power supply with the calculated current values $I_a$ to $I_c$ per zone.

Finally, it is also shown in the block diagram according to FIG. 1 that the central control device 1 comprises a central clock generator 21, which is also referred to as a master clock generator.

Only two converters 11 are shown in the block diagram according to FIG. 1, and these activate the stator windings, for example, in two successive zones 5 of the linear synchronous motor system. An activation, described below, of all the further converter stages 11 that are not specifically shown in FIG. 1 but are otherwise of identical construction is carried out by the central control device 1 via a data and/or communication bus structure 23 that is shown schematically.

Since, in the predefined speed and/or acceleration profile along the primary part of the linear synchronous motor system, the speed profile for all the secondary parts over a relevant zone 5, and hence for the converters 11 that are assigned to the respective zone 5, is constant, the relevant secondary parts therefore enter the respective zone 5 at a constant time interval T. On this basis, the requirements for each converter 11 are repeated at the clock time T.

On this basis, all that is necessary for the activation is that the respective data for generating a specific, zone-dependent phase profile are predefined to the individual converters 5, the individual profile generators 15 in the exemplary embodiment shown. Via this profile generator 15, it is then possible for the corresponding phase and current-amplitude values for activating the associated stator windings 7 to be calculated and generated. Otherwise, it is only necessary for a master clock rate to be supplied merely via the data bus structure 23 to the individual converters 11 by the central control device 1, that is to say in particular by the central clock generator (master clock) 21, in order to synchronize the master clock with the individual drive or slave clocks. The clock rate of the master clock generator determines and fixes the sequencing speed of the overall system, that is to say the speed of the secondary parts.

The corresponding data predefinitions for the phase profile may, if required, be transmitted via the same data and/or communication bus structure 23 (via which the clock synchronization between the master clock generator and the downstream converter, drive and clock generators is synchronized). In a deviation from this, these data for generating a corresponding phase profile can also be forwarded via a separate data and/or communication bus structure 23' between the central control device 1 and the individual converters.

Since the data for the phase profile only have to be transmitted once and otherwise only the synchronism between the master clocks and the slave clocks has to be maintained, it is necessary for comparatively only little data to be transmitted continuously. This also contributes to an increase in the robustness of the overall system, since even in the event of the occurrence of transmission faults or failures during the transmission of the data of the phase profile, the data transmission can be stopped and restarted, without this leading to a fundamental impairment of the control system.

It is preferable if, for each clock cycle T at which the secondary parts enter the respective zone 5, a corresponding absolute value for the clock control is transmitted at least once from the master clock to the slave clocks 5. The transmission density can be increased as desired. However, if a fault should occur and should it not be possible for a clock generator synchronization to take place within one clock cycle T, then, as a remedy, provision is made in the converters 11 for an extrapolation of the clock synchronization values to be generated internally, until a next clock telegram is received from the master clock generator 21 again.

The required phase profile, and hence the speed profile, for activating the stator winding 7 can be calculated in a different way in the individual converters.

It is possible for the phase profile, that is to say the data for the phase profile, to be made available to each converter 11 in the manner of a table, for example a so-called look-up table, which is reproduced below:

| Clock z | Phase angle φ | Current amplitude I |
|---------|---------------|---------------------|
| z1      | φ1            | I1                  |
| z2      | φ2            | I2                  |
| z3      | φ3            | I3                  |
| z4      | φ4            | I4                  |
| . . .   | . . .         | . . .               |

In other words, the speed profile for a zone and hence for the individual converters 11 is predefined by the values and data for the phase angle φ(z) and the current amplitude I(z) in relation to a clock generator time z, the individual converters 11—should this be necessary—being able to interpolate further intermediate values by computation between the step values predefined in this way.

In a deviation from this, the data for a corresponding phase profile can also be made available to the profile generators 15 in accordance with the following table:

| Clock z | Angular velocity ω | Current amplitude I |
|---------|--------------------|---------------------|
| z1      | ω1                 | I1                  |
| z2      | ω2                 | I2                  |
| z3      | ω3                 | I3                  |
| z4      | ω4                 | I4                  |
| . . .   | . . .              | . . .               |

In the case of this variant, the phase profile is calculated in the respective converter 11, starting from a start angle φ1 and from the angular velocities, made available in the form of a table, related to a clock change ω(z)=dφ/dz (=rotational velocity of the current vector), that is to say is calculated as a gradient based on the smallest resolvable time unit "tick" that is referred to below as "tick". In this case, it is not the phase angle for a specific time that is predefined for the converter, but rather the necessary change to this angle for a specific time, that is to say the rotational velocity of the current vector. The current amplitude is ascertained in the form of the relationship I(z), as in the first mentioned case.

In the converter 11, that is to say in the profile generator 15, the angular velocity in degrees/tick is calculated from the current clock time, the clock time is calculated from the change over time, and the current angular change in degrees is calculated from the change in the angular velocity in degrees/tick. The cumulative sum of all the angular changes results in the current desired angle φ.

In a third modification, the phase profile can be calculated in the form of the start time z1 and in the form of values, made available in the form of a table, for the angular velocity in relation to the clock time ω=dφ/dz over the angle φ.

| Phase angle φ | Angular velocity ω | Current amplitude I |
|---|---|---|
| φ1 | ω1 | I1 |
| φ2 | ω2 | I2 |
| φ3 | ω3 | I3 |
| φ4 | ω4 | I4 |
| ... | ... | ... |

Here, the converter 11 calculates the angular velocity in degrees/tick from the current angle φ, calculates the clock time from the change over time and calculates the current angular change in degrees from the angular velocity in degrees/tick. The cumulative sum of all these angular change [sic] results in the current desired angle φ.

In the case of this third method, therefore, the rotational velocity of the phase angle is represented as a function of the location w(φ). As a result of using synchronous linear drives, it is possible for the position of the primary part (in the form of tenter carriages in the case of a film stretching plant) that is moved along the secondary part to be set with sufficient accuracy equal to the position of the magnetic wave, since the poles of the permanent magnets of the secondary part (tenter) move in conformity with the electromagnetic wave of the primary part. From a theoretical point of view, the use of ω(φ) appears to be less advantageous than the two variants mentioned above, since φ itself is in turn a function of the time z. However, in practice this location-dependent consideration is expedient, since when operating the plant a specific speed profile is predefined for a specific location or for a specific region (and not for a time section), preferably in the form in which the speeds is [sic] normalized to 1 relative to a minimum speed, for example in the form of an initial speed or an entry speed.

The current intensity is represented as a function of φ in this third variant as well.

It is intended below to discuss the change to the rate of the master clock generator 21 which is carried out when a change is to be made to the drive speed along the linear synchronous motor system.

In the event of a change in the master clock rate, this change is transmitted via the data bus structure 23 to the individual converters 11 and, at the same time, in turn to the individual clock generators 13 on the converter side. When a corresponding master clock rate telegram arrives in the clock generators 13 on the converter side, a difference would then be established between the clock rate on the converter side and the master clock, which would intrinsically lead to an abrupt correction in the clock 13 on the converter side.

The method by which a less abrupt correction can be undertaken on the converter side will be explained with reference to FIG. 2.

FIG. 2 illustrates a diagram on whose X axis the time-axis period $t/t_T$ is reproduced, and on whose Y axis the maximum clock time $t_{max}$ of a clock generator 13 is reproduced.

Drawn therein is a sawtooth-like clock curve for the master clock generator which, in this exemplary embodiment, is changed from an initially set, greater clock time T [sic] to a steeper rising, shorter clock time T [sic].

An adaptation is now carried out in the converters 11 as a function of an interval $t_T$, in such a way that the master clock is matched in a time-equidistant manner in the clock generator 13 on the converter side. Therefore, whereas at the time 1 the master clock is already rising, the clock on the converter side only starts at the interval phase 2. The change to the master clock rate in the exemplary embodiment is carried out in the second clock phase, that is to say between $t_2$ and $t_3$. The corresponding time values T2 and T3 of the master clock are reached in the converter 11 in a manner offset by the abovementioned interval time $t_T$, the clock path between the values T2 and T3 being linearly interpolated in relation to the slave clock. That is to say, the abrupt change in the clock curve between the values T2 and T3 in the master clock is "moderated". In other words, the clocks in the clock generators 13 on the converter side are executed later, by the interval time $t_T$, than the corresponding clock values of the master clock. The values received in the $n^{th}$ data telegram from the master clock generator will only be reached when the $(n+1)^{th}$ received data telegram arrives.

A change to the phase profile in the converter will be discussed further below.

Changing the speed profile from a so-called "old profile" to a "new profile" when the system is running requires a change to the phase profiles of all the converters 11. However, this transition is not to be carried out abruptly, since the relevant secondary parts are brought to their new position by means of an equalization operation (transition). During this transition period, on this basis a relevant secondary part that is located in a relevant zone has to pass through a specific phase profile which is different both from the so-called "old profile" and from the "new profile".

In order not to have to transmit all the phase profiles of the primary parts that are involved in the transition to each converter 11 in advance (which would result in a considerable data information density between the central control unit 1 and the associated converters 11), provision is made for a transition function to be stored in the individual converters, or for corresponding data to be able to be supplied, for example by the central control device 1, said function making it possible, for example, to make a linear adaptation between the two profiles over time. Nonlinear transition functions are also possible, however. If the transition function is started simultaneously in all the converters 11, then the data with respect to the old phase profile, the data with respect to the new phase profile and the transition time are sufficient in order to preserve the synchronism. Using these data, each converter 11 is able to calculate the defined transition function assigned to it for the phase profiles during the transition.

The exemplary embodiment has been explained for the case in which a dedicated converter 11 having the components indicated is provided for each zone. However, it is entirely possible for at least two or more zones to be combined as groups which are activated by one converter or to which at least common components are assigned, for example a common slave clock generator, a common profile generator, a common coordination transformation stage and/or a common current-regulation output stage.

We claim:

1. Control device for linear-motor-driven equipment, in particular for the drive of tenters of a film stretching plant, having the following features, having a central control device (1) and a multiplicity of converters (11) that are activated thereby, at least indirectly, in each case at least one zone (5) of a primary part of a linear motor system (2) is assigned to the converters (11), the stator windings (7) of the linear-motor drive that are provided in the said system being able to be activated in order to drive at least one secondary part that can be moved along the primary part, the stator windings (7) in the individual zones (5) can be activated, via the converters (11), in such a way that phase profiles or speed profiles that are passed through periodically in each case at the end of one zone (5) and at the beginning of a subsequent zone (5) are matched to one another, each converter (11) is or groups of several converters (11) are assigned a separate computer unit (17, 19), the phase profiles or speed profiles are stored in the respective computer unit as a function of clock signals, in the relevant computer units (17, 19), the appropriate data for activating the stator windings (7) in the relevant zones (5) can be calculated and/or generated from the phase-profile data, characterized by the following further features a phase profile, which describes a relationship between the phase angle, the current amplitude and the clock signals, for activating the stator windings (7) in an associated zone (5), is stored in the computer units of the converters (11), and a synchronization device, via which the clock signals in the converters (11) can be synchronized with one another during operation, is provided.

2. Control device according to claim 1, characterized in that the synchronization device comprises a central clock generator (21) in the central control device (1).

3. Control device according to claim 2, characterized in that a change to the plant speed can be carried out by changing the clock rate generated in the central clock generator (21).

4. Control device according to claim 2, characterized in that, as a result of changing the clock rate in the central clock generator (21), and as a result of the clock control changed thereby in the converters (11), the plant speed can be changed such that the speed profile with which a secondary part can be moved along the primary part remains unchanged in relation to an initial speed or entry speed ($v_0$), irrespective of the absolute value of the plant speed.

5. Control device claim 1, characterized in that the converters (11) have current controllers.

6. Control device according to claim 1, characterized in that time compensation of the clock synchronization between the central clock generator (21) in the central control device (1) and the clock generators (13) in the converters (11) is carried out at least once per time interval T, the time interval T corresponding to the minimum clock time at which two successive secondary parts enter a zone (5).

7. Control device according to claim 1, characterized in that, in the event of failure of a clock synchronization signal coming from the central control device (1), clock signals can be generated in the converters (11) by means of extrapolation.

8. Control device according to claim 1, characterized in that the converters (11) can be supplied with new phase-profile data, preferably from the central control device (1), at the latest when the drive speed in the linear synchronous motor system is being changed.

9. Control device according to claim 1, characterized in that the phase-profile data for generating appropriate phase-angle and current-amplitude values in relation to a clock signal for activating the stator windings (3) in the relevant zones (5) can be supplied by the central control device (1) in the form of a table, preferably in the form of a look-up table.

10. Electronic [sic] control device according to claim 9, characterized in that the phase-profile data comprise the data (z) for the phase angle $\phi$ and the current amplitude (I) as a function of time.

11. Control device according to claim 10, characterized in that the phase-profile data comprise clock-dependent data in the form of the angular velocity ($\omega$) and data for the current amplitude (I).

12. Control device according to claim 9, characterized in that the phase-profile data comprise phase-angle-dependent data ($\phi$) for the angular velocity ($\omega$) and the current amplitude (I).

13. Control device according to claim 1, characterized in that in the converters (11), preferably the separate computer unit that is assigned to the converters (11), it is possible for transition data to be stored or preferably to be supplied by the central control device (1), via which data appropriate phase-angle and current-amplitude value [sic] can be calculated in the event of a change in the speed profile.

14. Control device according to claim 13, characterized in that the calculation and/or changing of the speed profile in the transition function from the previous to a new speed profile is preferably carried out linearly as a function of time.

15. Control device according to claim 13, characterized in that, in the event of a change to the speed profile, all the converters (11) can be activated by the central control unit (1) such that, in the converters (11), the appropriate values for the current amplitudes and phase angles for the power supply to the stator windings (7) are started simultaneously.

16. Control device according to one of claims 1 to 15, characterized in that the clocks calculated in the converters (11), in particular in the clock generators (13) on the converter side, are converted such that they are delayed by one clock phase ($t_7$) with respect to a predefined master clock.

* * * * *